United States Patent [19]

Simmons

[11] Patent Number: 4,828,443
[45] Date of Patent: May 9, 1989

[54] EYE BOLT AND METHOD OF MANUFACTURE

[76] Inventor: John P. Simmons, P.O. Box 356, Absarokee, Mont. 59001

[21] Appl. No.: 14,682

[22] Filed: Feb. 13, 1987

[51] Int. Cl.$^4$ ............................................. F16B 45/00
[52] U.S. Cl. .................................... 411/400; 10/27 R; 29/7; 248/231.9; 403/212; 411/385
[58] Field of Search ............... 411/385, 400, 401, 283; 140/117, 104; 29/7; 10/27 R; 248/231.9; 403/212

[56] References Cited

U.S. PATENT DOCUMENTS

| 464,465 | 12/1891 | Rogers | 411/400 |
| 503,367 | 8/1893 | Freeman | 29/7 |
| 898,912 | 9/1908 | Neller | 140/117 |

FOREIGN PATENT DOCUMENTS

| 15288 | of 1893 | United Kingdom | 29/7 |
| 2039233 | 8/1980 | United Kingdom | 10/27 R |

Primary Examiner—Gary L. Smith
Assistant Examiner—Curtis B. Brueske
Attorney, Agent, or Firm—Edward L. Brown, Jr.

[57] ABSTRACT

The invention is an eye bolt structure and method of forming including bending a straight rod to include a straight shank portion, a loop portion and a straight rod end portion, the rod end portion lying adjacent the shank portion; then placing at least one chain link around the shank and rod end portions and welding a portion of the outermost chain link to the rod end portion to maintain the loop.

8 Claims, 1 Drawing Sheet

EYE BOLT AND METHOD OF MANUFACTURE

BACKGROUND OF THE INVENTION

Eye bolts that are not cast have been formed in the prior art by various methods including wrapping the wire after the formation of the loop back around itself, as typified in U.S. Pat. No. 898,912.

Another method was to forge the eye after the rod was properly bent, as illustrated in U.S. Pat. No. 503,367. Another prior art method is to bend the end of the rod, forming the loop back and merely butt-welding the end to the shank, which method is a relatively weak construction.

SUMMARY OF THE INVENTION

The present invention is a welded design which incorporates the use of high strength steel welded chain links surrounding the bolt shank and the rod end with a portion of the link being welded to the rod end, which prevents the eye from opening under load. The first chain link which receives the shank and rod end of the bolt contains the loop of the bolt with its high strength steel although lesser in diameter than the bolt. The second link or portion thereof which is welded to the rod end prevents the rod end from pulling out of the first link with its weld joint acting in compression and shear.

It is therefore the principal object of the present invention to provide a new and improved welded eye bolt construction which utilizes chain links.

Another object of the present invention is to provide a method of forming an eye bolt wherein the welding does not weaken the strength of the bolt.

Another object of the present invention is to provide an eye bolt construction which is relatively simple in construction while providing substantial strength.

These and other important objects of the present invention are specifically set forth in or will become apparent from the following detailed description of the preferred embodiments of the invention, when read in conjunction with the accompanying drawings wherein.

DETAILED DESCRIPTION OF THE INVENTION

Figure 1:
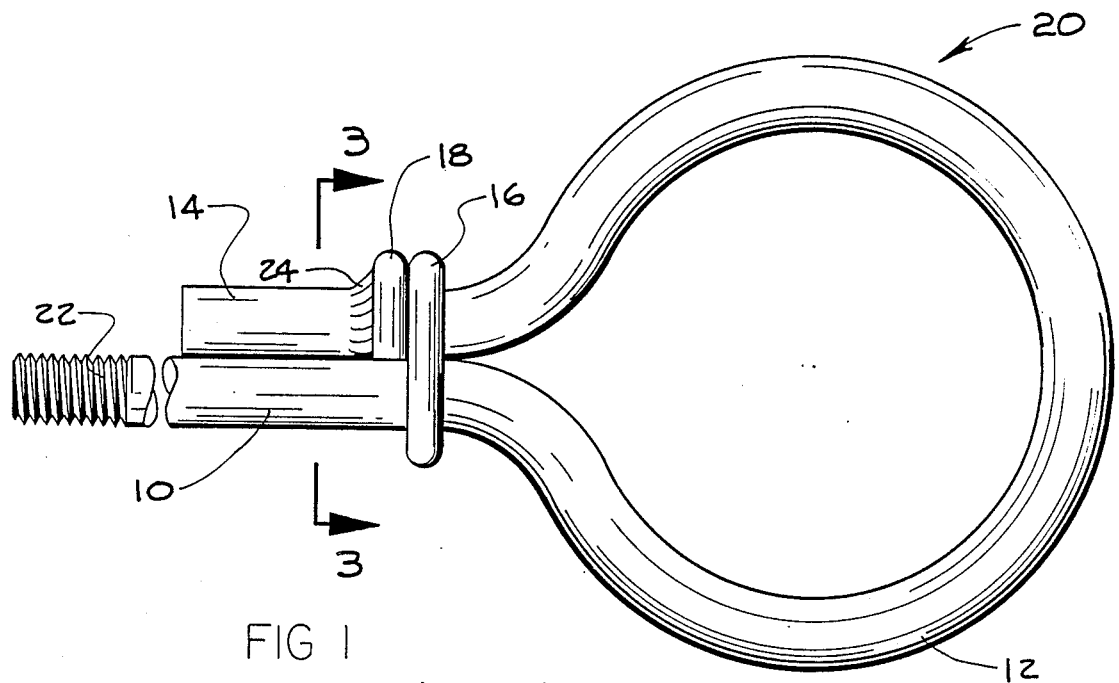
FIG. 1 is a plan view of the eye bolt in accordance with the principles of the present invention, with portions of the shank broken away.

The eye bolt of the present invention, which is generally defined by reference numeral 20, includes a shank portion 10, a loop portion 12 and a rod end portion 14. Surrounding shank 10 and end portion 14 is a chain link 16 and a half-link 18 welded to rod end portion 14. The shank portion 10 of the bolt is shown in FIG. 1 with portions broken away. However, in a typical specification, the shank would have an additional 20 inches of length with a four-inch diameter loop 12.

While eye bolts have a variety of applications, the specific application for this bolt is in hard rock mining wherein various mining equipment structures are hung from the ceilings and sides of a mine shaft or tunnel. The bolt 20 is used with a conventional anchor, not shown in the drawing, which is attached to the threaded end 22 of the bolt. The structural load requirements of the bolt 20 can vary depending upon the particular use, however, a typical ⅝ths diameter bolt would be utilized in a range up to 14,000 pounds load.

Figure 3:
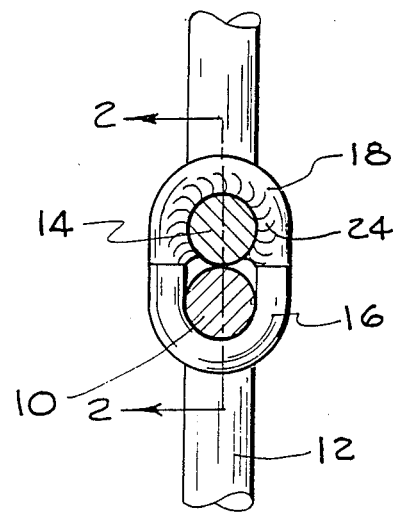
FIG. 3 is a partial sectional view taken along lines 3—3 of FIG. 1.

The eye bolt loop 12 is maintained by placing a chain link 16 around the shank 10 and rod end 14 as close to the loop 12 as possible. A half-link 18 is then placed just behind link 16 in a side-by-side contacting relation and is welded to rod end 14. In viewing FIGS. 1 and 3, it can be seen that the weld 24 extends substantially around the circumference of rod end 24 extends to provide a substantial weld area which prevents the rod end 14 from pulling out of link 16 and opening the loop.

Figure 4:
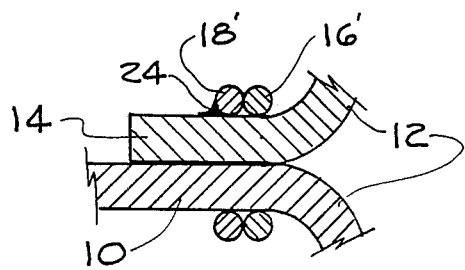
FIG. 4 is a sectional view of a modified form of the present invention.

Instead of using a half-link 18, as shown in FIG. 1, a full link 18' can be used as illustrated in FIG. 4, which provides a design of comparable strength. The rod stock from which the eye bolt 20 is formed can be of a variety of steels, as for example AISI 1018 steel. The chain links are made from high strength steel, as for example, 3/8ths chain grade 70 NACM.

Figure 2:
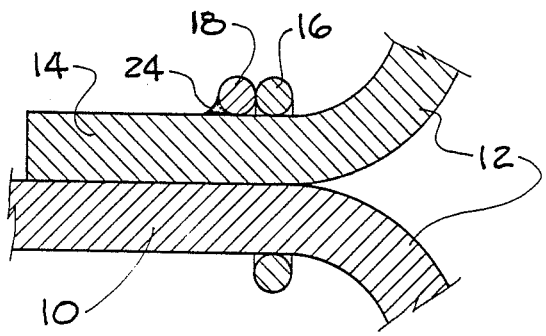
FIG. 2 is a partial sectional view taken along lines 2—2 of FIG. 3.

In viewing FIG. 2, with the eye bolt 20 under load, the rod end 14 will attempt to pull out of link 16 and open the loop. This tensile load in rod end 14 is transmitted through the weld 24 and partial link 18 to the surrounding link 16, thus preventing the loop 12 from opening or the rod end 14 from removal from link 16. Under a substantial load, the loop 12 of the eye bolt may deform and elongate somewhat, however, link 16 will contain the rod end 14 and the loop 12 will be maintained although deformed. Various other means could be utilized to prevent rod end 14 from withdrawing from link 16 such as enlarging the rod end so that it would not pass the opening in link 16 by means such as bending rod end 14 back over link 16, or attaching any structural piece to rod end 14 which is larger than the opening in link 16. The usage of a second full-sized chain link 18' in place of a half link, as illustrated in FIG. 4, has comparable structural integrity to the FIG. 1 design.

The shank portion 10 of the bolt is not weakened by any welding thereon and therefore provides an optimum strength bolt in a welded construction. The threaded end 22 of the bolt shank 10 can be of various lengths depending upon the requirements of usage and the particular anchor to which it is attached.

OPERATION

In a typical mine installation, a hole would be drilled into the rock and then a conventional anchor device, not shown in the drawing which are well-known in the art, would be inserted into the hole. The threaded end 22 of the eye bolt would be then threaded into the anchor causing the anchor to swell so that the bolt could carry its intended load. A typical bolt is fabricated from ⅝ths inch rod with a four-inch inside diameter loop and a 28-inch overall length. Various other sizes obviously could be used which would incorporate the same structural features.

Having described the invention with sufficient clarity that those skilled in the art may make and use it, what is claimed as new and desired to be secured by Letters Patent is:

1. An eye bolt utilized in underground mining comprising:

a steel rod means shaped to include a straight shank with an outside end, a loop portion and a rod end portion, the rod end portion lying parallel and adjacent the straight shank;

a high strength steel chain link surrounding the shank and rod end portion in contacting relation therewith;

attachment means directly attaching only the rod end portion to the chain link whereby the rod end portion cannot separate from the chain link during deformation of the loop portion.

2. An eye bolt utilized in underground mining comprising:

a steel rod means shaped to include a straight shank portion with an outside end, a loop portion and a rod end portion, the rod end portion lying parallel and adjacent the shank portion;

attachment means on the outside end of the shank portion;

a first chain link surrounding the shank and rod end portion in contacting relation therewith;

a second link positioned adjacent the first link surrounding the rod end portion and welded to the rod end portion preventing the rod end from pulling out of the first link under load.

3. An eye bolt as set forth in claim 2 wherein the second link is only a partial link positioned outside the first link.

4. An eye bolt as set forth in claim 2 wherein the shank portion has a threaded end adapted for attachment to an anchor means.

5. An eye bolt as set forth in claim 2 wherein the chain link members are of high strength steel.

6. An eye bolt utilizied in underground mining comprising:

a rod member shaped to include a straight shank portion, a loop portion and a straight rod end portion, the rod end portion lying adjacent the shank portion;

attachment means on the shank portion; and at least two chain links in side-by-side adjacent relation surrounding the shank and rod end portion of the rod in contacting relation therewith, the link farthest from the loop portion is welded to the rod end portion preventing the rod end from pulling out of the links under load.

7. A method of forming an eye bolt comprising the steps of:

bending a straight rod to include a straight shank a loop portion, and a straight rod end portion, the rod end portion lying adjacent the straight;

placing at least one high strength steel chain link around the shank and the rod end portion adjacent the loop; and directly attaching only the rod end portion to the chain link to maintain the loop.

8. A method of forming an eye bolt comprising the steps of:

bending a straight rod to include a straight shank portion, a loop portion and a straight rod end portion, the rod end portion lying adjacent the shank portion;

placing at least two chain links in side-by-side relation around the shank and rod end portions adjacent the loop; and welding a portion of the outermost chain link to the rod end portion to maintain the loop.

* * * * *

UNITED STATES PATENT OFFICE
CERTIFICATE OF CORRECTION

Patent No. 4,828,443        Dated  May 9, 1989

Inventor(s)  John P. Simmons

It is certified that error appears in the above-identified patent and that said Letters Patent is hereby corrected as shown below:

Column 4, line 16, following "straight", insert - - shank - -

Signed and Sealed this

Tenth Day of March, 1992

Attest:

HARRY F. MANBECK, JR.

*Attesting Officer*        *Commissioner of Patents and Trademarks*